United States Patent [19]
Tomita et al.

[11] Patent Number: 5,718,823
[45] Date of Patent: Feb. 17, 1998

[54] DEVICE FOR BIOLOGICAL WASTEWATER TREATMENT

[75] Inventors: Minoru Tomita, Toda; Toshiyuki Nakamura, Tokyo, both of Japan

[73] Assignee: Organo Corporation, Tokyo, Japan

[21] Appl. No.: 740,591

[22] Filed: Oct. 31, 1996

[30] Foreign Application Priority Data

Dec. 20, 1995  [JP]  Japan ................................ 7-349294

[51] Int. Cl.$^6$ ..................................................... C02F 3/10
[52] U.S. Cl. ........................ 210/150; 210/615; 261/122.1
[58] Field of Search ............................... 210/150, 151, 210/220, 615; 261/122.1, 123

[56] References Cited

U.S. PATENT DOCUMENTS

| | | | |
|---|---|---|---|
| 4,137,171 | 1/1979 | Yokata | 210/150 |
| 5,262,051 | 11/1993 | Iwatsuka | 210/615 |
| 5,397,474 | 3/1995 | Henry | 210/615 |
| 5,554,291 | 9/1996 | Scanzillo et al. | 210/615 |
| 5,578,202 | 11/1996 | Hirame | 210/150 |

*Primary Examiner*—Thomas G. Wyse
*Attorney, Agent, or Firm*—Fish & Richardson P.C.

[57] ABSTRACT

The present invention provides a device for biological wastewater treatment which prevents flotation and deformation of mesh tubes packed in a reactor tank as microorganism retaining materials. Device for biological water treatment 10 of the present invention comprises reactor tank 11; microorganism retaining media 12, which are installed in the tank; and air diffuser tubes 14, and wastewater distributor tube 16, both of which are installed under the microorganism retaining media. The microorganism retaining media comprise supporting media 22 and mesh tubes 24, which are installed on the supporting media. The supporting media are constituted in a manner that at least two the beams 26 are arranged on each supporting tier in parallel at certain intervals and the direction of the arrangement of the beams is alternately shifted by an angle of 90 degrees at every supporting tier. Also, the supporting tiers are piled in a manner that a space between two adjacent supporting tiers is enough for arranging mesh tubes on a supporting tier. The mesh tubes on each supporting tier are supported by beams of said supporting tier and arranged in parallel with beams on the adjacent tier.

11 Claims, 6 Drawing Sheets

DEVICE FOR BIOLOGICAL WASTEWATER TREATMENT

BACKGROUND OF THE INVENTION

1. Field of the Invention

The present invention relates to a device for biological treatment of wastewater which contains contaminants, such as nitrogenous components and organic matter. More specifically, it relates to a device in which biological wastewater treatment is attained under an aerobic or anaerobic condition by metabolism of the microorganisms attached to mesh tubes. These tubes are installed in a reactor tank for the purpose of retaining microorganisms thereon.

2. Description of the Related Art

Lately, devices for "attached-growth type" (also known as the "fixed-growth type") biological wastewater treatment are widely used. In an attached-growth type device, wastewater treatment is carried out in such a manner that packed beds are formed in a reactor tank and then immersed in wastewater to be treated.

In biological wastewater treatment using the attached-growth type device, microorganism retaining materials or packing media, such as mesh tubes and long-fiber bundles, are installed in the reactor tank of a biological wastewater treatment device. The microorganism retaining materials are immersed in wastewater to be treated. Microorganisms are attached to and grown on the retaining materials, and metabolism of the microorganisms causes decomposition or removal of contaminants in the wastewater being treated.

In the treatment under aerobic conditions, aerobic microorganisms are utilized. The aerobic microorganisms grow on the retaining materials under the aeration of oxygen-containing gas, such as air, from the lower part of the tank. The aerobic microorganisms perform biological decomposition or removal of contaminants matter in the wastewater by utilizing oxygen which has been dissolved in the wastewater by the aeration. The anaerobic treatment and the aerobic treatment are analogous methods except that the former utilizes anaerobic microorganisms and is carried out without aeration. When biological wastewater treatment is carried out under a condition that atmospheric air is shunned from packed beds in the reactor tank, the attached-growth type method can be applied to the anaerobic treatment in which methane fermentation, denitrification, and the like are carried out.

In the attached-growth type method, wastewater treatment is attained by utilizing the function of decomposition of contaminants by microorganisms, which are growing on the retaining materials. Therefore, the performance of the attached-growth type method, for example the capacity of reactor tank per unit volume and the rate of removing contaminants, is greatly influenced by the microorganisms retaining capacity of the packing media, i.e. quantity of attached microorganisms per unit volume of the packing media. This requires that the packing media should have capacity to retain microorganisms with high density.

For the reasons mentioned above, heretofore, packing media comprising various organic or inorganic materials have been used as microorganism retaining media. Above all, mesh tubes are widely used because they have higher capacities to retain microorganisms, are easy to handle, and do not have high construction costs.

A mesh tube is a molded hollow cylinder substance and the tube surface is reticulately formed. The mesh tube is characterized by large capacity to retain microorganisms and high overall oxygen transfer coefficient. By way of example, FIG. 8 shows mesh tube P which is a cylindrical mesh tube made of thermoplastic synthetic resin with a bore diameter of 4–10 cm.

Heretofore, as it is represented by cylindrical mesh tubes P which are given in FIG. 9 as an example, mesh tubes were horizontally, closely arranged in parallel on each tier and piled in tiers in a manner that the longitudinal direction of the mesh tubes was shifted by an angle of 90 degrees at every tier. This framework is installed in a reactor tank as a packed bed. As a general rule, when to be installed in the reactor tank, cylindrical mesh tubes with the length of several meters are cut down to lengths suitable for the reactor tank.

However, in a conventional device for biological wastewater treatment in which mesh tubes are packed in a manner described above, there have been the following problems.

First, mesh tubes are deformed. As shown in FIG. 8, the mesh tube has an opening at each end and its cylindrical surface is reticulately formed. Therefore, the mesh tube does not have enough rigidity to bear the compressive force applied to it in the direction of its diameter. This makes it liable to deformation. When mesh tubes are piled in tiers in the manner described above, those on lower tiers are liable to be deformed owing to the weight of those on upper tiers.

Further, as microorganisms become attached and grow on the mesh tubes during biological wastewater treatment, the mesh tubes become much heavier after being installed in a reactor tank. When wastewater is removed from the reactor tank for the purpose of inspection or the like, the weight of mesh tubes in upper tiers impose a compressive force to those in lower tiers in the direction of the tube diameter as buoyancy (upflow of wastewater) to the mesh tubes decreases. Then, the mesh tubes on lower tiers are dented or collapsed. As a result, clogging of the mesh tubes occurs at the broken places, thereby leading to channeling of wastewater being treated or interruption of flow of air to be used for aeration or cleaning. This lowers efficiency of the device for wastewater treatment.

A second problem is that mesh tubes float easily. Generally, the specific gravity of mesh tubes made of synthetic resin is nearly equal to or less than that of water. Therefore, mesh tubes installed in a reactor tank are liable to float in the wastewater being treated. Specially in aerobic treatment, air used for aeration or cleaning is fed from under the mesh tubes, causing the mesh tubes to float more easily. Even under anaerobic treatment, minute bubbles being generated during the treatment, such as methane, carbon dioxide, and nitrogen, attach to the tube. This produces buoyancy and the mesh tube becomes liable to floatation.

If the mesh tubes float, a packed bed in which mesh tubes are piled crosswise in tiers as shown in FIG. 9 will crumble, whereby packing density will become uneven and the mesh tubes will be bent. Due to the clogging resulting from unevenness of density or bending of the mesh tubes, the flow of wastewater and air is deflected. This lowers treatment efficiency in the device.

SUMMARY OF THE INVENTION

In view of the problems described above, the present invention is directed to provide an improved device for biological wastewater treatment which prevents deformation and flotation of the mesh tubes installed as microorganism retaining materials (packing media) in a reactor tank.

In order to achieve the above object, a device for biological wastewater treatment according to the present invention comprising:

a reactor tank in which a space for wastewater to be treated is provided;

inflow means for feeding wastewater to be treated into said space;

outflow means for discharging wastewater already treated from said space;

a frame for partitioning said space into a plurality of supporting tiers; and a packing media layer in which a plurality of mesh tubes for retaining microorganisms are arranged in parallel, said packing media layer being provided in each of said supporting tiers.

The aforementioned frame is constructed in such a manner that at least two beams are arranged on each of said supporting tiers in parallel at certain intervals and beams on two adjacent supporting tiers cross each other.

No particular restriction is imposed on configuration and material of the aforementioned beams as long as they can bear the weight of the mesh tubes and beams installed in the upper layers. For example, metallic materials, such as U-types, H-types, angles and pipes may be used.

The aforementioned beams and mesh tubes are arranged in parallel on each supporting layer. The number of beams to be arranged thereon differs depending on the packing media load to be supported and the section modules of beams to be used. If the diameter of the treatment space in a reactor tank is small, two beams will be sufficient. Beam height needs not be the same as the space between two adjacent supporting tiers. Each space between two adjacent supporting tiers may be maintained by utilizing spacers or beam connecting couplings. These beams are piled crosswise in tiers in such a manner that the direction of the disposition of the beams is alternately shifted at every tier. However, beams on a supporting tier do not have to meet at right angles with those at the adjacent supporting tiers. For example, lozenge fabrication similar to parallel crosses is adequate.

No restriction is imposed on the space between two adjacent supporting tiers as long as mesh tubes can be arranged on each supporting tier in parallel with beams of the respective adjacent supporting tiers. For example, in cases where a single layer of mesh tubes are arranged on a supporting tier, the space between the supporting tier and the adjacent upper or lower supporting tier can be slightly shorter than the diameter of a mesh tube if the mesh tube is flexible. Also, uniformity of the space between two adjacent supporting tiers is not required. Any of the space may differ from another within the whole supporting media. It is preferable that the bending moment is not applied to beams. Therefore, beams should be arranged in such a manner that the point of application where the load of an upper supporting tier is applied to the lower supporting tier runs in a straight vertical line.

Mesh tubes used as microorganism retaining materials in the present invention are made of synthetic resin such as polyolefine plastics and are molded cylindrical molds whose tube surfaces are reticulate. No restriction is imposed on configuration of the cylindrical molds, pattern of mesh, and method of molding. For example, a conventional mesh tube shown in FIG. 8 can be used.

Mesh tubes are arranged on beams of each supporting tier in such a manner that mesh tubes and beams on said supporting tier cross each other and mesh tubes on said supporting tier are in parallel with beams on the adjacent upper supporting tier. No restriction is imposed on how the mesh tubes are arranged. They may be arranged at some distance or close to each other. Only a single layer of mesh tubes may be arranged on beams of each supporting tier. It is also acceptable to arrange several layers of mesh tubes on beams of each supporting tier. Further, configuration of mesh tubes to be arranged may differ from supporting tier to supporting tier.

It is preferable that mesh tubes should be tightly packed between lower and upper supporting tiers in order to prevent the mesh tubes from wafting. More specifically, if only a single layer of mesh tubes are arranged on a supporting tier, a diameter of the mesh tubes and a space between lower and upper tiers should be much the same. If double layers of mesh tubes are arranged on a supporting tier, a total height of two laminated mesh tubes and a space between lower and upper tiers should be much the same.

The form of arrangement of mesh tubes described above makes the present invention is very effective.

In the present invention, mesh tubes are supported by beams at each supporting tier so that the weight of mesh tubes on upper supporting tiers does not apply as compressive force to those on lower supporting tiers. Even though the mesh tubes become heavier during wastewater treatment because of microorganisms becoming attached and growing on the surfaces of the mesh tubes, the form of packing mesh tubes will not become disorderly and mesh tubes on lower supporting tiers will not be collapsed by the weight of mesh tubes on upper supporting tiers, unlike a conventional packing layer of mesh tubes. Therefore, clogging of broken mesh tubes, any channeling of treated water flow and difficulty of air flow will not occur, whereby high efficiency of the device for biological wastewater treatment will be maintained for a long period of time.

Due to upflow of wastewater undergoing treatment, aeration in case of the aerobic treatment and attachment of gas bubbles to mesh tubes in case of the anaerobic treatment, buoyancy is generated and applied to the mesh tubes. However, as the mesh tubes are supported by the upper and lower beams, flotation of the mesh tubes and deformation of the mesh tubes will not occur.

DESCRIPTION OF THE PREFERRED EMBODIMENTS

Embodiment 1

The constitution of what is considered to be a preferred embodiment of the present invention will subsequently be described by reference to the attached drawings.

Figure 1:
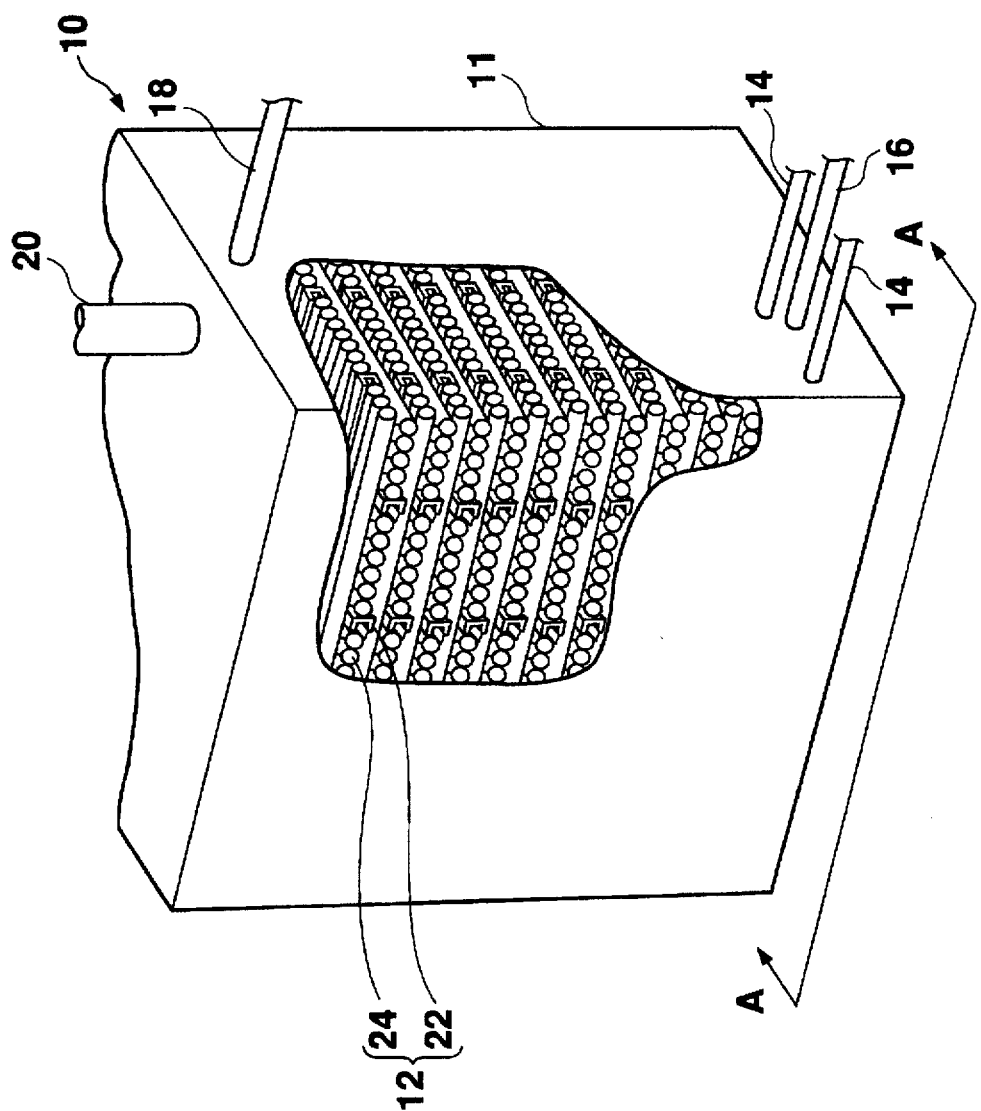
FIG. 1 is a partial cross-sectional cut-away view illustrating constitution of the device for biological wastewater treatment given in Embodiment 1 of the present invention.
Figure 2:
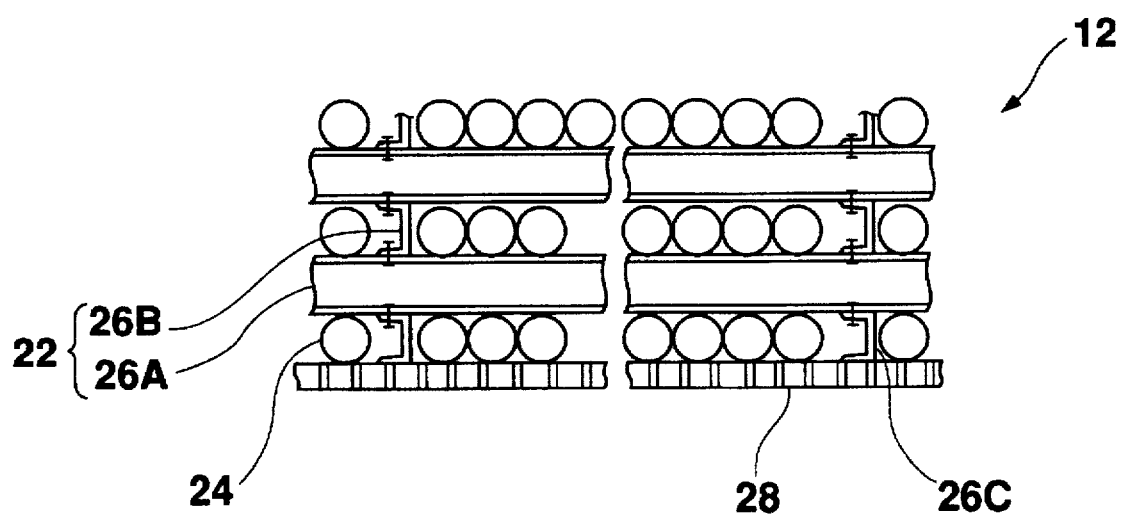
FIG. 2 is a side view of the microorganism retaining media given in view A—A of FIG. 1.
Figure 3:
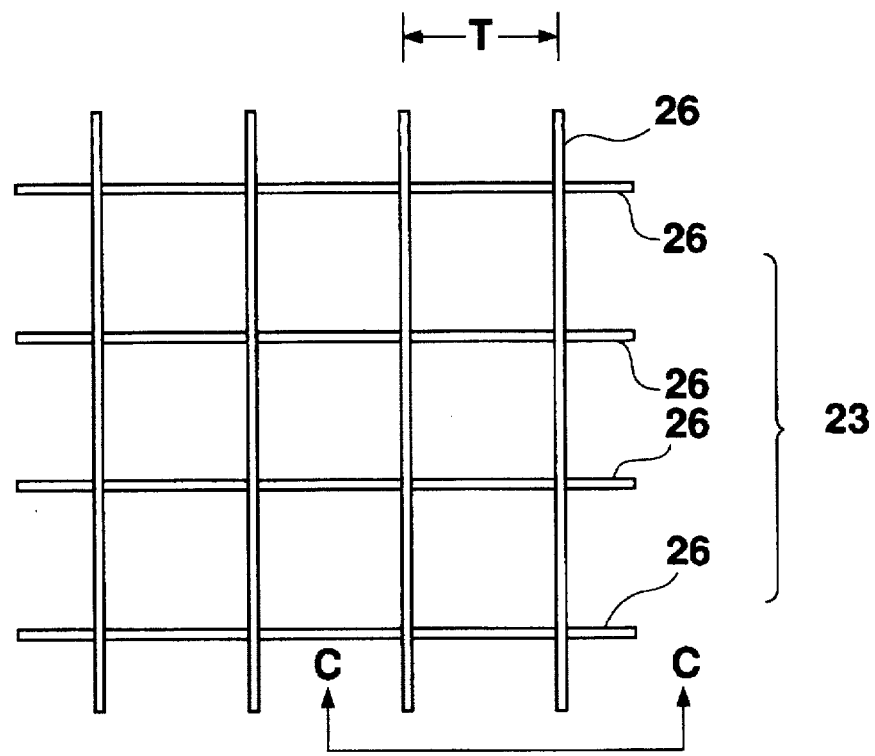
FIG. 3 is a top view of supporting media illustrating the arrangement of beams which are constituents of the supporting media.
Figure 4:
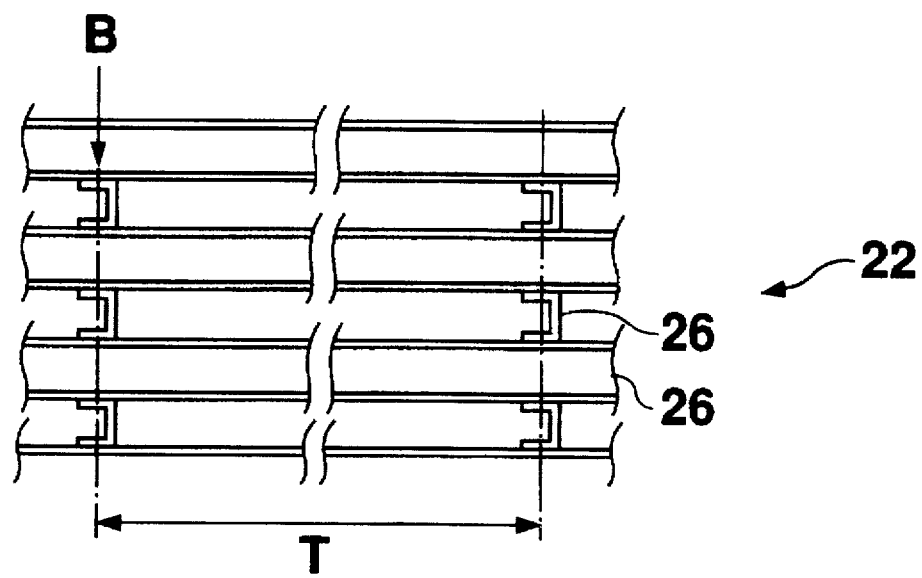
FIG. 4 is a side view of the supporting media given in view C—C of FIG. 3.

This embodiment pertains to the device for biological wastewater treatment of the present invention in which a U-steel is used as beam. FIG. 1 is a partial cross-sectional cut-away view of a reactor tank which is installed in the device for biological wastewater treatment of Embodiment 1. FIG. 2 is a side view of the packing media in section A—A of FIG. 1. FIG. 3 is a top view of a supporting tier illustrating arrangement of beams. FIG. 4 is a side view of the supporting medium in section C—C of FIG. 3.

In this embodiment, a device for biological wastewater treatment 10 includes a reactor tank 11, the section of which is square. In the reactor tank, microorganism retaining media (packing media) 12 is installed. Under the microorganism retaining media, a plurality of air diffuser tubes 14 and a wastewater distributor tube 16 are provided. Further, discharging tube 18 for treated water and exhaust gas tube 20 are connected to the upper part of the reactor tank.

As shown in FIGS. 1 and 2, microorganism retaining media 12 consist of supporting media 22 and a group of mesh tubes 24. The mesh tubes are supported by the supporting media and function as microorganism retaining materials.

As shown in FIG. 3, in supporting media 22, four beam sections 26 are horizontally arranged on each supporting tier 23 in parallel at an interval of two meters (shown by "T" in FIGS. 3 and 4). Also, beams 26 are piled in tiers in a manner that the longitudinal direction of the beams is shifted by an angle of 90 degrees at every tier. Thus, the supporting media eight meters in length and width are installed in reactor tank 11 of the almost same two dimensions in such a framework as shown in FIG. 4.

In this embodiment, U-steel (steel channel) which is 75 mm in width, 40 mm in height and 5 mm in thickness is used as beam 26. Corrosion resistant surface processing, such as galvanizing finish, tar epoxy finish, painting, or lining is applied to the surface of the U-steel. In construction of supporting media 22, U-steel sections are piled in a manner that the cross direction faces vertically.

Figure 5:
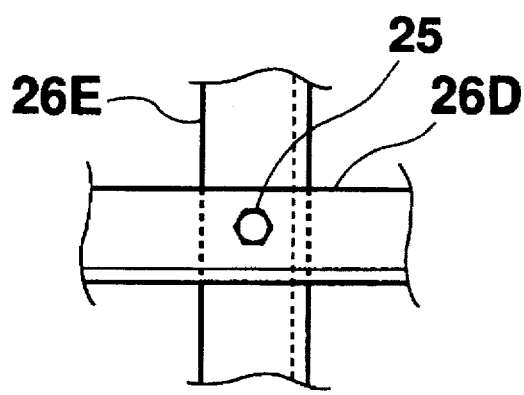
FIG. 5 is a detail drawing illustrating connecting parts of beams.

FIG. 5 is an enlarged top view of view B of FIG. 4 illustrating the connecting parts of beams 26. As shown in FIG. 5, beam 26D and beam 26E, which is piled under beam 26D, are fixed to each other by means of bolt 25. A method of fixing beams 26 does not have to be limited to the one described above. Other methods such as jointing by welding and coupling by fitting may be applied. In the case of a heavy beam, placement on another beam may be sufficient. To prevent the bending moment from being applied to beams 26, the connecting parts of beams 26 are constructed to be positioned along a straight vertical line as shown in FIG. 4.

By fixing upper and lower beams 26 to each other between supporting tiers, supporting media 22 is synthetically formed to be a solid framework.

Figure 8:
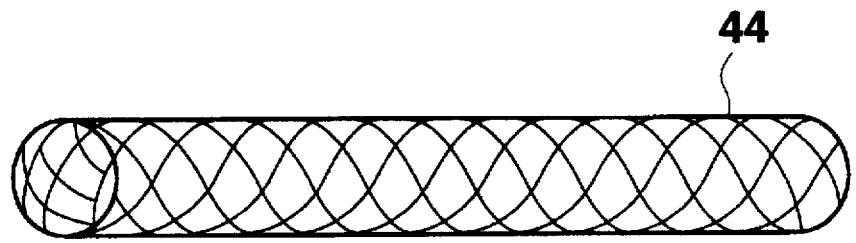
FIG. 8 is a cut-away view of a mesh tube.
Figure 9:
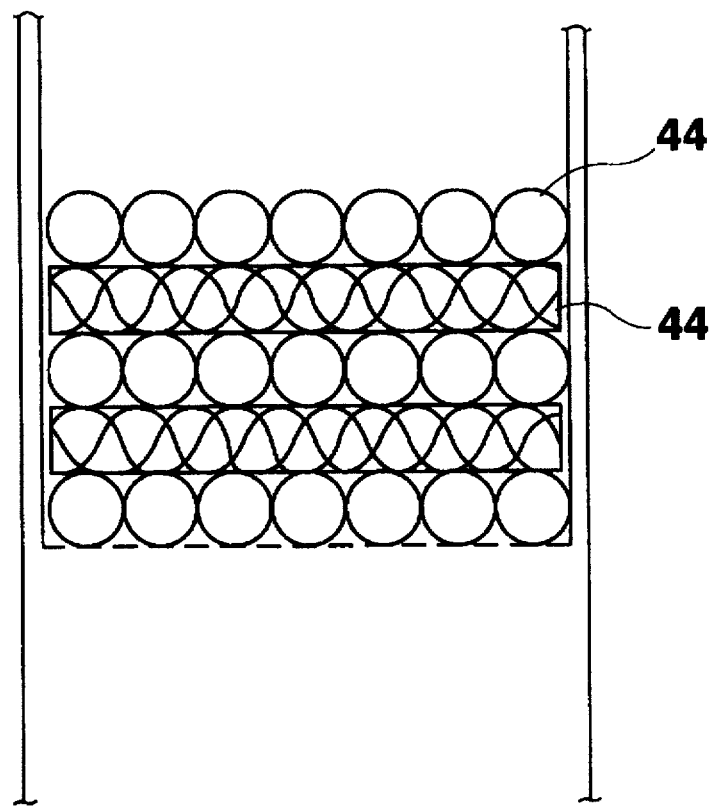
FIG. 9 is a conceptual drawing illustrating constitution of conventional microorganism retaining media.

For mesh tubes 24 to be used as microorganism retaining materials, cylindrical mesh tubes "P"s with a diameter of 70 mm (brand name: AKUCHIRAITO SUPER) are used as shown in FIG. 8. As shown in FIG. 2, a layer of these mesh tubes are arranged closely to each other on beams 26, for example beams 26A, which are installed on every supporting tier of supporting medium 22. Also, these mesh tubes are in parallel with beams 26B which are arranged on the adjacent upper supporting tier. The same arrangement applies correspondingly to the other mesh tubes "P"s. As shown in FIGS. 1 and 2, mesh tubes "P"s are packed in supporting medium 22.

In this embodiment, as shown in FIG. 2, beams 26C and mesh tubes 24 to be piled on the bottom pier are arranged on a perforated plate, for example grating 28. Mesh tubes 24 are piled in piers one after another up to the top pier in supporting media 22. Beams 26 are placed crosswise as a weight on mesh tubes 24 piled on the top pier in order to prevent mesh tubes 24 from floating. Therefore, a grating which has heretofore been used to prevent the mesh tubes from floating off from the top pier may be omitted.

A plurality of air diffuser tubes 14 being diverged from a header (not shown in drawings) are installed under microorganism retaining media 12 along the floor face of reactor tank 11. Air diffuser tube 14 has a number of air squirt muzzles (not shown in drawings).

In the device for biological wastewater treatment 10 of this embodiment, wastewater to be treated flows into reactor tank 11 through wastewater distributor tube 16. The wastewater then comes into contact with mesh tubes 24 while flowing upward in the reactor tank. In the aerobic treatment, air for aeration is also introduced from the air diffuser tubes.

When the wastewater to be treated makes contact with mesh tubes 24, pollutants in the wastewater is biologically decomposed by metabolism of the microorganisms grown on mesh tubes 24 and purification of the wastewater proceeds. The purified water flows upward in reactor tank 11 and then it is discharged from discharging tube 18.

Due to the constitution described above, the weight of the mesh tubes is borne by beams 26 installed on each supporting tier of supporting media 22. In this embodiment, unlike the conventional constitution, even though mesh tubes 24 become heavier during the wastewater treatment as a result of the growth of microorganisms on the surface thereof, weight of the upper mesh tubes is not added to the lower mesh tubes as a compressive load even when wastewater is removed from reactor tank 11 at the time of inspection or the like. Therefore, mesh tubes 24 are not collapsed.

Also, as the load of the upper beams 26 is imposed to the lower beams 26 in a straight vertical line, the compressive stress is vertically applied to beams 26, but the bending stress is scarcely applied to them. Therefore, cheaper U-steels with thin wall thickness can be used as beams 26.

A force to raise mesh tubes in water is generated due to buoyancy by the water, dynamic pressure by upflow of wastewater to be treated, and further, in case of the aerobic treatment, air for aeration. However, as mesh tubes 24 are firmly held between beams 26 of supporting medium 22, any disorder of the packing media arrangement resulting from flotation of mesh tubes 24 does not occur. Mesh tubes 24 are maintained in the same condition as the initial arrangement.

Even in the anaerobic treatment, buoyancy is generated because minute gas bubbles generated during the treatment become attached to the surface of mesh tubes 24. However, for the same reason as in the case of the aerobic treatment, mesh tubes are maintained in the same condition as the initial arrangement.

Embodiment 2

Figure 6:
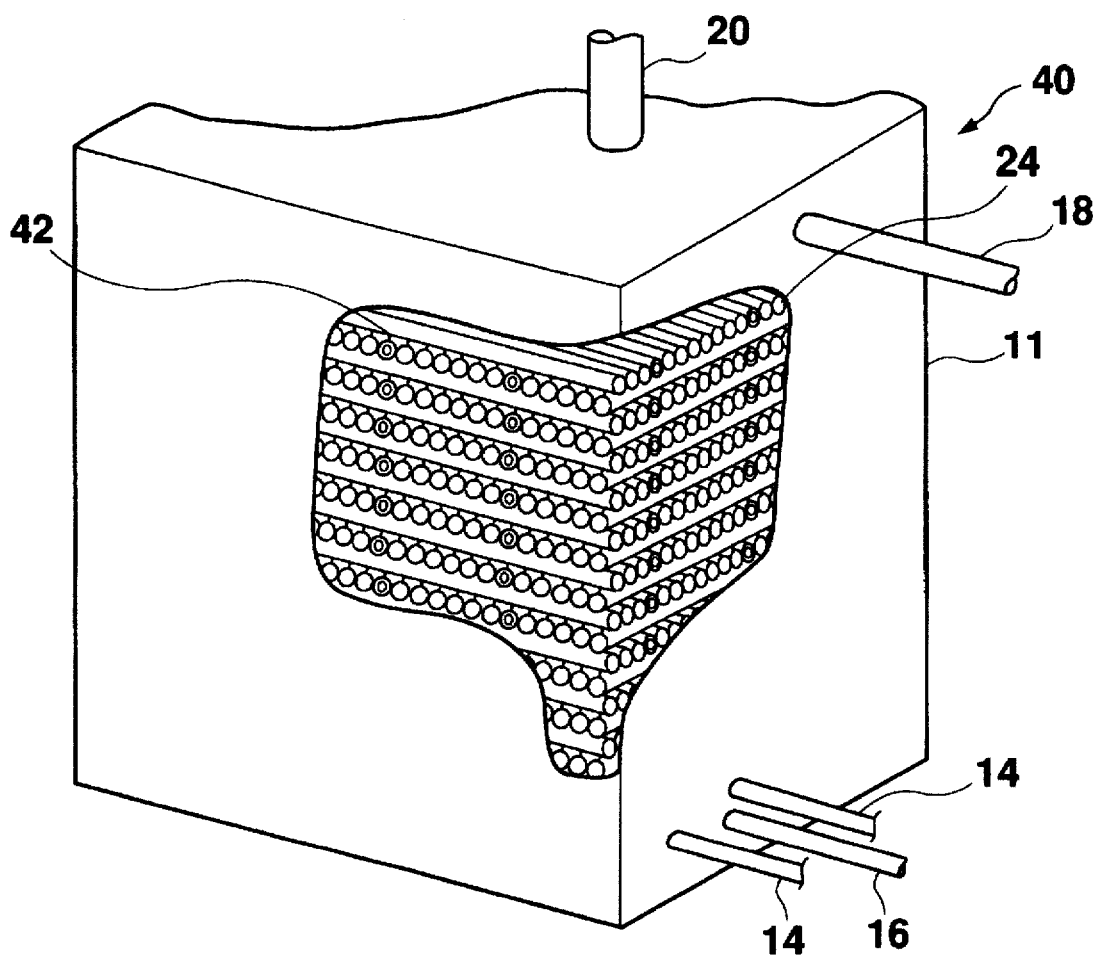
FIG. 6 is a partial cross-sectional cut-away view illustrating constitution of the device for biological wastewater treatment given in Embodiment 2 of the present invention.

This embodiment pertains to a device for biological wastewater treatment of the present invention in which pipes are used as beams. FIG. 6 is a partial cross-sectional cut-away view of the reactor tank installed in the device for biological water treatment of embodiment 2. As for the parts shown in FIG. 6, corresponding numbers are assigned to those which are already shown in FIGS. 1–5, and their description is omitted.

In the device for biological water treatment 40 of embodiment 2, instead of the U-steels in embodiment 1, stainless steel pipes with an outside diameter of 60.5 mm and wall thickness of 3 mm are used as tubular beams 42, and are horizontally arranged on each supporting tier in parallel at an interval of 1.5 m.

Figure 7:
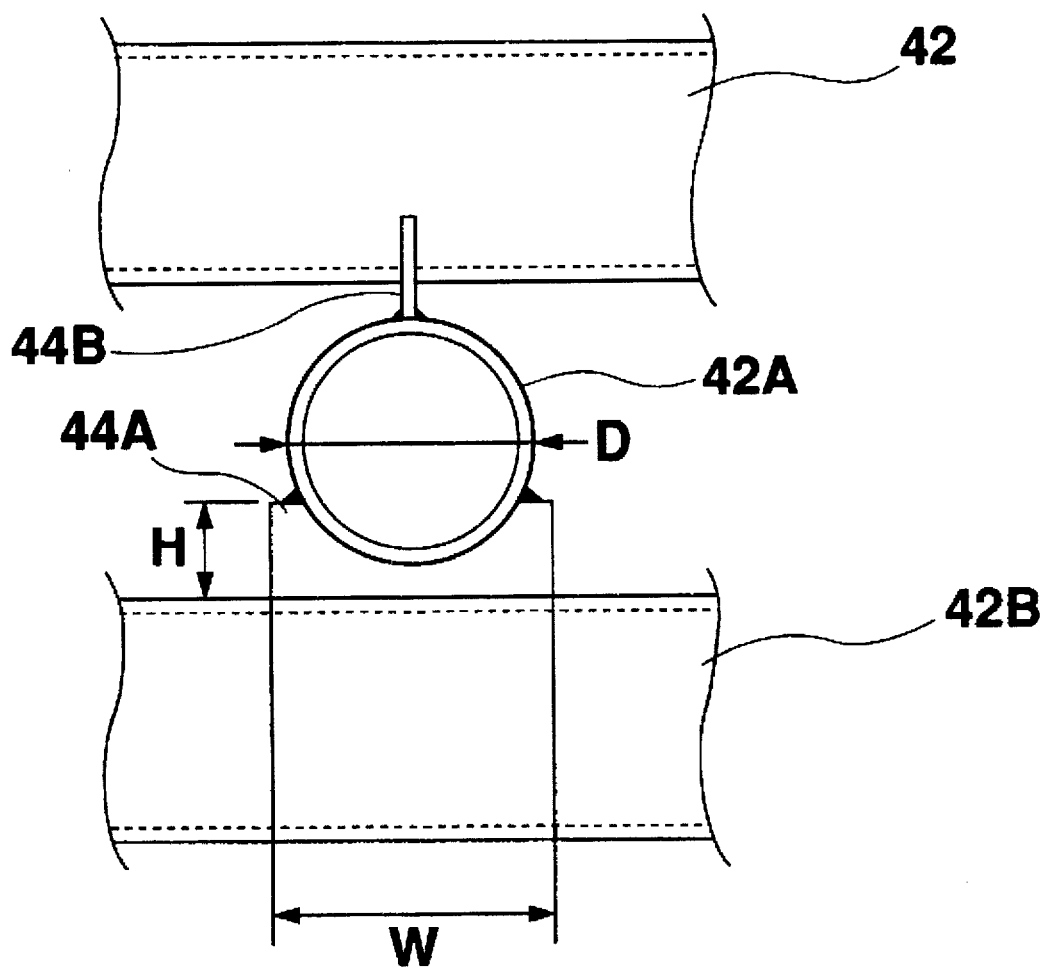
FIG. 7 is a detail drawing of connecting parts of the beams given in Embodiment 2.

As shown in FIG. 7, tubular beams 42A and 42B on the upper and lower tiers are fixed to each other by means of plate type bolster 44A.

Bolster 44 is fixed on beam 42B by welding in a manner that its cross direction runs along a longitudinal axis of beam 42B and its longitudinal direction faces to a vertical direction. Bolster 44 is 50 mm in height, 70 mm in width, and 3 mm in thickness. At the upper part of bolster 44, a circular notch matching with the outside diameter of beam 42 is provided. The lower part of beam 42A, which is piled above beam 42B in a manner that beams 42A and 42B are piled across each other, is fitted into the circular notch of bolster 44 and firmly fixed by welding it to the edge of the circular notch.

By using a number of bolsters 44 in the manner described above, supporting medium 22 is synthetically formed to be a solid framework.

As shown in FIG. 6, mesh tubes 24 are arranged on supporting medium 22 in the same manner as that of embodiment 1. Description of the constitution same as that of embodiment 1 will be omitted.

Due to the constitution described above, flotation and damage of mesh tubes 24 will not occur in this embodiment as was the case for embodiment 1.

In the aforementioned embodiments 1 and 2, the description is given of a case in which wastewater to be treated flows upward in reactor tank 11. However, even though wastewater to be treated flows downward in reactor tank 11, the present invention can cope with such a situation, whereby the same result can be obtained.

Numerical values shown in embodiments 1 and 2 are only examples. No restriction is imposed on numerical values. Another type of mesh tubes in place of cylindrical mesh tubes may be used. Also, H-type members or solid round bars may be used as beams In the present invention, microorganism retaining media to be packed in a reactor tank of the device for biological wastewater treatment comprises supporting media and a group of mesh tubes. The supporting media is constituted in a manner that at least two pieces of beams 26 or 42 are arranged on each of supporting tiers in parallel at certain intervals and the direction of the arrangement of the beams is alternately shifted at every supporting tier. Also, the supporting tiers are piled in a manner such that a space between two adjacent supporting tiers is enough for arranging mesh tubes on a tier. Mesh tubes on each supporting tier are supported by likewise, mesh tubes are beams of the same supporting tier of the supporting media. Arranged in parallel with beams on the adjacent upper tier. Due to the aforementioned constitution which prevents deformation and flotation of mesh tubes and the like installed as microorganism retaining materials, a device for biological wastewater treatment capable of maintaining high performance for a long period of time is provided.

More specifically, even though water is removed from the reactor tank for the purpose of inspection or the like in such a condition that mesh tubes have become heavier due to the growth of microorganisms thereon, the weight of the upper mesh tubes is not imposed on the lower tubes because the mesh tubes are supported by beams at every supporting tier. Therefore, disorder of the tier arrangement or collapse of mesh tubes, which has caused channeling of water to be treated and air, will not occur, and efficiency of the device for biological treatment will not be deteriorated.

A force to raise mesh tubes in water is generated due to dynamic pressure by upflow of water to be treated, in case of the aerobic treatment, air for aeration and, in case of the anaerobic treatment, attachment of gas bubbles to the mesh tubes. However, as mesh tubes are firmly held between the beams installed on upper and lower piers, flotation of mesh tubes and disorder of arrangement of the mesh tubes will not occur.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. A device for biological wastewater treatment comprising:
   a reactor tank in which a space for treating water to be treated is provided;
   inflow means for feeding wastewater to be treated into said space;
   outflow means for discharging wastewater already treated from said space;
   a frame for partitioning said space into a plurality of supporting layers; and
   a packing media layer in which a plurality of mesh tubes to retain microorganisms are arranged in parallel, said packing layer being provided in each of said supporting layers.

2. The device for biological wastewater treatment according to claim 1, wherein said frame is constituted in a manner that at least two beams are arranged on each of said supporting layers in parallel at certain intervals and beams on adjacent supporting layers cross each other.

3. The device for biological wastewater treatment according to claim 2, wherein height of said beams and diameter of said mesh tubes are about the same.

4. The device for biological wastewater treatment according to claim 3, said beams are made of U-steel.

5. The device for biological wastewater treatment according to claim 3, wherein said beams are made of tubular steel.

6. The device for biological wastewater treatment according to claim 2, wherein said beams are arranged in parallel with said mesh tubes in each of said supporting layers.

7. The device for biological wastewater treatment according to claim 2, wherein each intersectional position of beams being installed in adjacent supporting layers is fixed by a fixing member.

8. The device for biological wastewater treatment according to claim 2, wherein each intersectional position of beams being installed in adjacent supporting layers runs in an approximately straight vertical line.

9. The device for biological wastewater treatment according to claim 2, wherein said beams in adjacent filter layers cross each other at an approximately right angle.

10. The device for biological wastewater treatment according to claim 1, wherein said mesh tubes are made of synthetic resin.

11. The device for biological water treatment according to claim 1, wherein said reactor tank is provided with aeration means for feeding air into said space in order to provide an aerobic condition.

* * * * *